United States Patent
Zimmerman et al.

(10) Patent No.: US 10,470,604 B2
(45) Date of Patent: Nov. 12, 2019

(54) DELAYED FILL OF BEVERAGE MACHINE HEATER TANK

(71) Applicant: Keurig Green Mountain, Inc., Burlington, MA (US)

(72) Inventors: Jennifer Zimmerman, Woburn, MA (US); William T. Jacobs, Lynnfield, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 451 days.

(21) Appl. No.: 13/795,695

(22) Filed: Mar. 12, 2013

(65) Prior Publication Data
US 2014/0272023 A1 Sep. 18, 2014

(51) Int. Cl.
  *A47J 31/46* (2006.01)
  *A47J 31/40* (2006.01)
  *A47J 31/56* (2006.01)

(52) U.S. Cl.
  CPC ............. *A47J 31/402* (2013.01); *A47J 31/56* (2013.01)

(58) Field of Classification Search
  CPC .......... A47J 31/402; A47J 31/56; A47J 31/00; A47J 31/32; A47J 31/3623; A47J 31/3628; A47J 31/3633; A47J 31/54; F24H 1/00; F24H 1/20
  USPC ................................................. 426/231, 590
  See application file for complete search history.

(56) References Cited

U.S. PATENT DOCUMENTS

| | | | | |
|---|---|---|---|---|
| 3,422,745 A | * | 1/1969 | Eisendrath | A47J 31/56 219/518 |
| 3,589,385 A | * | 6/1971 | Vitous | A47J 31/54 137/145 |
| 4,309,939 A | * | 1/1982 | Stover | A47J 31/002 99/280 |
| 4,550,651 A | * | 11/1985 | Haynes | A47J 31/467 426/433 |
| 4,682,537 A | * | 7/1987 | Snowball | A47J 31/0573 99/282 |

(Continued)

FOREIGN PATENT DOCUMENTS

| TW | I293869 B | 3/2008 |
|---|---|---|
| TW | 201012737 A | 4/2010 |
| WO | WO 2007051200 A2 | 5/2007 |

OTHER PUBLICATIONS

International Search Report and Written Opinion dated Apr. 28, 2014 from corresponding PCT Application No. PCT/US2014/020467.

*Primary Examiner* — Steven N Leff
(74) *Attorney, Agent, or Firm* — Wolf, Greenfield & Sacks, P.C.

(57) ABSTRACT

A beverage forming method and system in which a heater tank can be filled with liquid to an expansion level after a beverage is formed. The liquid in the heater tank may be heated, causing expansion of the liquid in the tank. Thereafter, a volume of liquid may be delivered to the tank to fill the tank to a liquid delivery level at which the tank is filled to deliver a controlled volume of liquid to form a beverage. No further heating of liquid in the tank may be performed or required after filling to the delivery level since the volume of liquid delivered to fill the tank to the liquid delivery level may be relatively small. Accurate volumes of liquid may be delivered in a way that compensates for any expansion that may occur due to heating.

25 Claims, 2 Drawing Sheets

(56) References Cited

U.S. PATENT DOCUMENTS

| | | | |
|---|---|---|---|
| 4,791,860 A * | 12/1988 | Verheijen | A47J 31/402 99/275 |
| 4,809,594 A * | 3/1989 | Vitous | A47J 31/002 426/433 |
| 5,195,422 A | 3/1993 | Newnan | |
| 5,388,501 A * | 2/1995 | Hazan | A47J 31/002 99/285 |
| 5,623,574 A | 4/1997 | Knepler | |
| 5,676,040 A * | 10/1997 | Ford | A47J 31/467 99/280 |
| 6,079,315 A | 6/2000 | Beaulieu et al. | |
| 6,095,031 A * | 8/2000 | Warne | A47J 31/007 99/282 |
| 6,142,063 A * | 11/2000 | Beaulieu | A47J 31/32 99/283 |
| 6,202,894 B1 * | 3/2001 | Struminski | B67D 1/0037 222/129.3 |
| 6,543,335 B1 | 4/2003 | Lassota | |
| 6,759,072 B1 * | 7/2004 | Gutwein | A23F 5/243 426/429 |
| 7,047,870 B2 * | 5/2006 | Gantt | A47J 31/402 99/283 |
| 7,089,849 B2 * | 8/2006 | Chen | A47J 31/057 99/290 |
| 7,398,726 B2 | 7/2008 | Streeter et al. | |
| 7,455,867 B1 * | 11/2008 | Gutwein | A23F 5/243 426/433 |
| 7,523,695 B2 | 4/2009 | Streeter et al. | |
| 2005/0126401 A1 * | 6/2005 | Streeter | A47J 31/32 99/279 |
| 2006/0000363 A1 * | 1/2006 | Streeter | A47J 31/32 99/279 |
| 2007/0056994 A1 * | 3/2007 | Woodnorth | A47J 31/54 222/221 |
| 2010/0024658 A1 * | 2/2010 | Jacobs | A47J 31/46 99/302 R |

* cited by examiner

DELAYED FILL OF BEVERAGE MACHINE HEATER TANK

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY OF INVENTION

In some embodiments, a beverage forming apparatus may be arranged to accurately deliver one or more volumes of liquid to form a beverage in a way that compensates for expansion of the liquid that may occur during heating. That is, many systems that fill a heater tank and then deliver the liquid after heating may not provide consistent and accurate liquid volumes because no accommodation is made for expansion of the liquid when heated. For example, a volume of cold water will generally increase in volume as it is heated. Thus, if a volume of cold water is delivered to a heater tank, heated, and then delivered to form a beverage, the volume of hot water delivered will be larger than the starting cold water volume. Moreover, this expansion can become more noticeable and/or be a problem for larger volumes of water. For example, heating a volume of water from about 40 degrees F. to about 200 degrees F. may increase the volume by about 4%, e.g., a starting cold water volume of 100 ounces may expand to about 104 ounces after heating. Such an increase may be problematic where a specific volume of beverage is to be prepared and dispensed into a container. For example, if 100 ounces of cold water are provided to a heater tank, heated and delivered to form a beverage, the actual volume used to prepare the beverage may be about 104 ounces. If 104 ounces are actually prepared and delivered, the beverage may not only be made too diluted or of insufficient strength, but also may be larger than the container into which the beverage is to be dispensed.

In accordance with an aspect of the invention, a beverage forming machine may be arranged to fill a heater tank to an initial expansion level with liquid to be heated, and then later add additional liquid to the tank, e.g., after heating of the liquid to a desired temperature is complete, to fill the tank to a liquid delivery level at which a controlled volume of liquid is delivered from the tank to form a beverage. The volume of liquid added to the tank to establish the liquid delivery level may be relatively small compared to the volume of the tank and/or the volume of liquid to be delivered to form the beverage. In one example, the volume of liquid added to establish the liquid delivery level may be 5% or less of the tank volume or the volume of liquid to be delivered to form a beverage. Thus, changes in volume of the liquid due to heating may be compensated by heating the main bulk of the liquid to the desired temperature, and then adding a relatively small amount of liquid to the tank to establish the desired volume to form a beverage.

In one aspect of the invention, a beverage forming apparatus includes a housing to support components of the beverage forming apparatus, and a beverage forming station supported by the housing and arranged to combine a precursor liquid with a beverage material to form a beverage that is dispensed via a dispense outlet. A precursor liquid supply system may provide precursor liquid to the beverage forming station, and include a heater tank with a heater to heat liquid in the tank. The heater tank may have one or more liquid delivery levels to which the heater tank is filled to deliver a controlled volume of liquid to the beverage forming station to form a beverage, and an expansion level below any of the liquid delivery levels to which the tank is filled for heating of liquid. A control circuit may be arranged to control the liquid supply system to deliver precursor liquid to the heater tank to fill the heater tank to the expansion level after completing formation of a beverage, and may control the liquid supply system to fill the heater tank to the liquid delivery level in response to receiving a beverage formation start command. For example, immediately before delivering liquid from the heater tank to form a beverage, the control circuit may cause the liquid supply to fill the tank to the liquid delivery level, and then cause liquid to be delivered from the tank to form a beverage. By topping off the heater tank immediately prior to delivering liquid from the tank for beverage production, the tank can be accurately filled to a desired level and an accurate volume of liquid can be delivered.

In some embodiments, the beverage formation start command may be received in response to a user actuating a beverage start switch (e.g., pressing a brew button), completion of heating of liquid in the heater tank (e.g., by the control circuit detecting that liquid in the tank has reached a desired temperature), closure of a brew chamber or cartridge holder (e.g., that holds a beverage cartridge used to make a beverage), or other signal indicating that the beverage machine is being readied to make a beverage. For example, the control circuit may first cause the heater tank to be filled to the expansion level, cause liquid in the tank to be heated to a desired temperature, and then fill the tank to the liquid delivery level. The machine may then wait for a user to command that the machine start a beverage cycle to make a beverage, or may automatically start beverage formation once the liquid delivery level is reached, e.g., the liquid may be delivered without any delay for further heating liquid in the tank.

In some embodiments, the heater tank may include a single liquid delivery level, e.g., near a top of the heater tank, although two or more liquid delivery levels are possible. The heater tank may also include a liquid level sensor arranged to detect a liquid level at the liquid delivery level, such as one or more conductive probes that provide a signal indicating that liquid has reached a particular level in the tank. The liquid level sensor may also be used to detect that the tank is filled to the expansion level if desired. Liquid in the tank may be delivered to the beverage forming station by an air pump arranged to pressurize the heater tank to force liquid from the heater tank to the beverage forming station.

In another aspect of the invention, a method for controlling a beverage forming apparatus includes providing a beverage forming apparatus having a heater tank with a liquid delivery level to which the heater tank is filled to deliver a controlled volume of liquid to form a beverage. After completing a beverage formation cycle (e.g., during which liquid is delivered from the tank to form a beverage), the heater tank may be filled to an expansion level below any liquid delivery level of the heater tank. That is, during the previous beverage formation cycle, the tank may be drained at least partially of liquid to a post-dispense level below the expansion level. The liquid in the heater tank may be heated after the heater tank is filled to the expansion level, e.g., to a temperature suitable for forming a coffee beverage, such as about 195 degrees F. After heating is complete, the heater tank may be filled to the liquid delivery level in response to receipt of a beverage formation start command, e.g., such as a signal indicating completion of heating, a user pressing a start button to make a beverage, etc. Thereafter, liquid may be delivered from the heater tank to form a beverage.

In some embodiments, filling the heater tank to the liquid delivery level includes using a liquid level sensor to detect a liquid level in the heater tank at one of the liquid delivery levels. For example, a valve may be opened or a pump operated to deliver liquid to the heater tank, and the valve may be closed or the pump stopped when a level of liquid in the tank reaches the liquid delivery level. Similarly, filling the heater tank to the expansion level may include using a liquid level sensor to detect a liquid level at the expansion level. As noted above, delivering liquid from the heater tank to form a beverage may be performed immediately after the heater tank is filled to the liquid delivery level.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
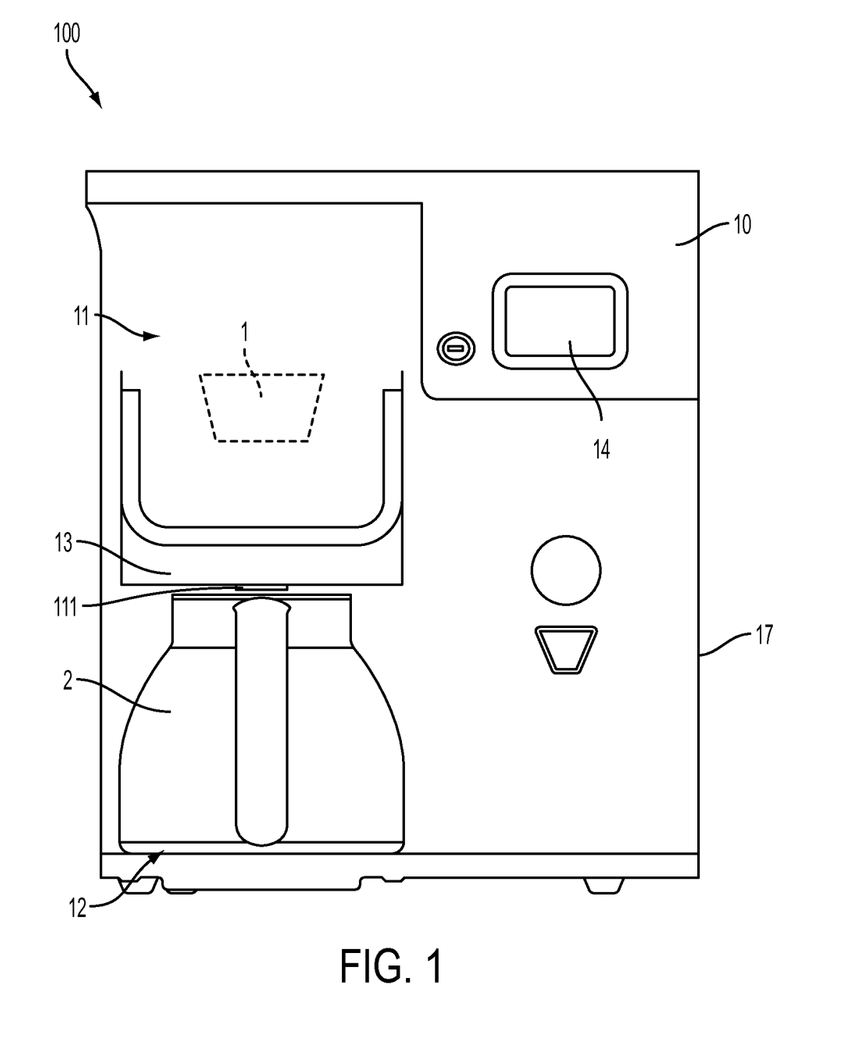
FIG. 1 is a front view of a beverage forming apparatus in an illustrative embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe is any suitable container arranged to receive a dispensed beverage). If used, the cartridge 1 may be manually or automatically placed in a beverage forming station 11 of a beverage forming machine 10. For example, the beverage forming station 11 may include a cartridge holder that is exposed to receive the cartridge 1 when the user operates a handle or other actuator. With the cartridge 1 placed in the cartridge holder, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

In this embodiment, the beverage forming machine 10 includes a housing 17 that houses and/or supports components of the machine 10, such as a user interface 14 used to control system operation, and defines a carafe receiving area 12 at which the carafe 2 is positionable to receive beverage dispensed by the machine 10 via a dispense outlet 111. Thus, at the carafe receiving area 12, the carafe 2 is associated with the machine 10 to receive a dispensed beverage and may be supported by the housing 17. The carafe 2 may be received at the carafe receiving area 12 so that the carafe 2 is at least partially surrounded by the housing 17, or the carafe 2 may be more exposed when at the carafe receiving area 12. The apparatus 100 may include a carafe lid detector 13 that is arranged to detect whether a lid that covers the beverage opening of the carafe 2 is in an open position or a closed position. For example, the lid detector 13 may include a camera or other imaging device that images a portion of the carafe 2 and uses image analysis to determine whether a lid of the carafe is in an open or closed position. In other arrangements, any suitable sensors may be used to detect a lid's presence, such as magnetic, inductive, resistive, capacitive or other sensors used to detect a magnetic or other physical characteristic of a lid. In some embodiments, the beverage forming machine 10 may be controlled to dispense beverage from the dispense outlet 111 only if the carafe 2 is detected to have its lid in the open position. However, the machine 10 need not necessarily have a lid detector 13, and instead may make beverage whether the carafe 2 is suitably positioned at the carafe receiving area 12 or not.

In accordance with an aspect of the invention, the beverage forming machine may be arranged to initially fill a heater tank (or other liquid conditioning tank) to an expansion level below a liquid delivery level at which the tank is configured to deliver a controlled volume of liquid for beverage formation. After heating of the liquid in the tank, an additional volume of liquid may be delivered to the tank, if necessary, to raise a liquid level in the tank to the liquid delivery level. Thereafter, liquid may be delivered for forming a beverage. By completing filling of the tank to the liquid delivery level after heating of the liquid to a desired temperature, the machine may be made less sensitive to variations in liquid volume due to thermal expansion. Aspects of the invention may be used with other liquid conditioning operations that effect a volume of the liquid, such as chilling, carbonating, and others. Thus, aspects of the invention are not necessarily limited to use with systems that heat a liquid.

Figure 2:
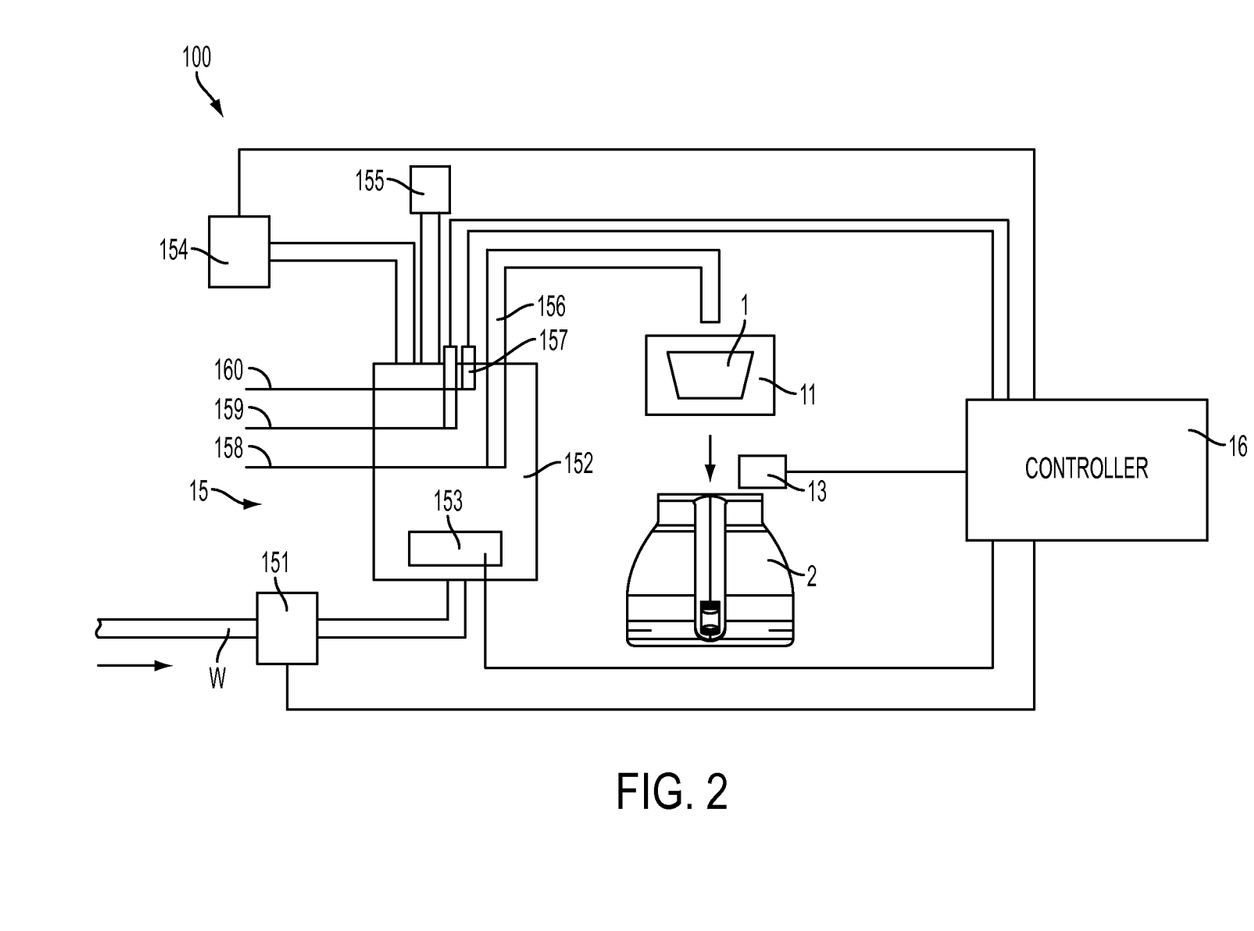
FIG. 2 is a schematic diagram of components of a beverage forming apparatus in an illustrative embodiment.

FIG. 2 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2.

The liquid supply 15 in this embodiment controls the volume of liquid provided to the beverage forming station 11 by filling the tank to a liquid dispense level 160 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 160 and a post-delivery level 158 at a bottom of the conduit 156 in the tank 152. However, to help ensure an accurate volume of liquid is delivered to the beverage forming station 11, the control circuit 16 initially fills the tank 152 to an expansion level 159, and heats the liquid in the tank 152 before subsequently filling the tank 152 to the liquid dispense level 160. Heating of the liquid prior to filling the tank 152 to the dispense level 160 may be sufficient to raise the temperature of the liquid to a final desired temperature, such as that suitable for brewing coffee from coffee grounds, or some other temperature that is above the temperature of liquid provided to the tank 152. As noted above, by filling the tank 152 to the expansion level 159 and then heating the liquid, all or most of any expansion of the liquid due to heating may occur before additional filling of the tank 152 to the dispense level 160. That is, the liquid supply 15 may provide relatively cool liquid (e.g., in a temperature range of 40-80 degrees F.) to the tank 152, but in many beverage forming applications, liquid in the tank 152 is heated to 180-205 degrees F. prior to being delivered to a beverage forming station 11. This relatively large temperature increase causes the liquid to expand in the tank 152, and could effectively cause overfilling of the tank 152 if the tank were filled to the dispense level 160 prior to heating. Thus, the tank 152 may be more reliably and accurately filled at the time of delivery of liquid to the beverage forming station 11 than if the tank 152 were filled to the dispense level 160 and then the water were heated.

A top-off volume of liquid needed to be added to the tank 152 to raise the liquid level in the tank from the expansion level 159 to the dispense level 160 may be relatively small, such as 5%, 7% or 10% or less of the total tank volume and/or a dispense volume of liquid delivered from the tank to the beverage forming station during a beverage formation cycle. By having the top-off volume of liquid be a relatively small amount, any need for additional heating of the liquid in the tank 152 may be reduced or eliminated, and adding the top-off volume to the tank may have a small impact on any thermal expansion or contraction of liquid in the tank 152. For example, 64 ounces of liquid may be delivered from the heating tank 152 to the beverage forming station 11 during a beverage cycle. However, once a beverage cycle is completed, about 60 ounces of liquid may be added to the tank 152 to fill the tank from the post-dispense level 158 to the expansion level 159. After heating, the 60 ounce volume may have expanded to about 62 or 63 ounces, or possibly less. After heating to a desired temperature is complete, 1 or 2 ounces may be added to the tank 152 to raise the liquid level to the dispense level 160. This relatively small amount of additional liquid (whether in comparison to the delivery volume or the total tank volume) may allow the system to accurately deliver the desired volume during a subsequent beverage cycle, while having little effect on the temperature of the liquid in the tank 152 and/or requiring additional heating of the liquid. Note also that although a delivery volume for the tank 152 in this example is 64 ounces, a total volume of the tank 152 may be 1.5, 2, 3, 4 or more times that amount. As a result, the top-off volume added to the tank to raise the liquid level to the dispense level 160 may be a relatively small percentage of the total tank volume. If the total tank volume is heated to a desired temperature, the addition of this small amount of liquid may have little to no real effect on the temperature of the liquid in the tank. Thus, if desired, the liquid in the tank 152 may be delivered to the beverage station 11 immediately after the tank is filled to the dispense level 160 and without any delay for heating of liquid in the tank 152. Alternately, if heating is performed after the top-off volume is added, any heating required should be relatively minimal.

In this embodiment, the liquid supply 15 provides liquid to the tank 152 via a valve 151 that is coupled to a source W. The source W may have any suitable arrangement, e.g., may provide liquid from a storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap). However, by employing the techniques described herein, the machine 10 can accommodate a wide range of supply liquid temperatures while reliably delivering an accurate dispense volume for each beverage formation cycle.

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the expansion level 159. In response to the level sensor 157 detecting liquid at the sensor 157, the control circuit 16 may close the valve 151. After heating of the liquid in the tank 152 so the liquid reaches a desired temperature, the control circuit 16 may again open the valve 151 to deliver additional liquid to the tank 152 until the liquid level reaches the delivery level 160. Another conductive probe or other liquid level sensor 157 may be used to detect when the liquid level reaches the delivery level 160, and in response, the control circuit 16 may close the valve 151.

In some embodiments, the control circuit 16 need not add liquid to the tank 152 to raise the liquid level to the dispense level 160 immediately after a desired temperature is reached in the tank 152. Instead, the control circuit 16 may delay addition of liquid to fill the tank 152 to the delivery level 160, maintaining the temperature of the liquid in the tank 152 at a desired level until a user presses a beverage start switch or otherwise instructs the machine 10 to produce a beverage. At that time, the control circuit 16 may bring the liquid level in the tank 152 to the dispense level 160 and then deliver liquid to the beverage forming station 11. With this approach, any evaporation of liquid, leaking or other occurrence that changes the volume of liquid in the tank 152 may be compensated for because the tank 152 is brought to the dispense level 160 immediately before liquid is delivered to form a beverage. As noted above, the control circuit 16 may operate to fill the tank to the dispense level 160 upon receipt of any suitable beverage formation start command, such as liquid temperature in the tank reaching a desired level, a user's depression of a start switch, closure of a cartridge holder or other chamber that holds a beverage material for mixing with precursor liquid, and so on.

Although in this embodiment, the tank 152 has only one dispense level 160, the tank 152 could have two or more dispense levels. This way the machine 10 in this embodiment could be capable of providing different volumes of liquid for forming a beverage. For example, the liquid level sensor 157 may include multiple elements provided at different heights in the tank 152 so that the tank 152 may be filled to different levels, allowing the liquid supply 15 to provide different volumes of liquid to the forming station 11. Also, although in this embodiment the liquid level sensor includes a pair of conductive probes capable of contacting liquid in the tank 152 and providing a signal (e.g., a resistance change) indicative of liquid being present at respective levels in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the expansion level 159.

Further, a liquid level sensor need not be used to fill the tank to the expansion level 159. Instead, other techniques may be used to suitably fill the tank 152, such as opening the valve 151 for a defined period of time that is found to correspond to approximate filling of the tank 152 to the expansion level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the expansion level 159 may depend on the technique used to provide liquid to the tank. For example, control of a volume of liquid provided to fill the tank 152 to the expansion level 159 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner"). Accordingly, even liquid conditioning processes that cause the volume of liquid in the tank 152 to reduce in volume may be employed with aspects of the invention.

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 1 or not. Alternately, the beverage forming station 11 may function simply as an outlet for heated, cooled or otherwise conditioned water or other liquid, e.g., where a beverage medium is contained in the carafe 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

As noted above, the beverage forming apparatus 100 may include a carafe lid detector 13 that detects whether the carafe lid is in an open or closed position. The detector 13 may detect the presence or absence of the lid 24, and thus detect whether the lid 24 is in the open or closed position. If the lid 24 is detected to be in the closed position, the control circuit 24 may prevent the apparatus 100 from operating to dispense a beverage to the carafe 2. Alternately, the control circuit 16 may interpret the lid 24 being detected in the open position as a beverage formation start command, and fill the tank 152 to the delivery level 160 in response. Thereafter, the liquid could be delivered to the beverage forming station 11 or wait until a user presses a start button. Note that the apparatus 100 need not necessarily be prevented from operating to produce a beverage if the carafe lid is detected to be closed or is not detected to be open. For example, the apparatus 100 may operate to produce a beverage and store the beverage in a holding tank if the carafe lid 24 is closed. If the carafe lid 24 is detected to be in the open position, the control circuit 16 may then control the apparatus 100 to dispense the stored beverage from the holding tank to the carafe 2. The lid detector 13 may include one or more Hall effect sensors, optical detectors, reed switches, microswitches that are closed by physical contact with the carafe lid, and/or other components to detect the presence or absence of the lid 24. The control circuitry 16 may be arranged to suitably interpret any type of signal provided by the detector 13 to determine the lid open/closed state.

According to an aspect of the invention, a method for controlling a beverage forming apparatus may include providing a beverage forming apparatus having a heater tank with a liquid delivery level to which the heater tank is filled to deliver a controlled volume of liquid to form a beverage. After completing a beverage formation cycle, the heater tank may be filled to an expansion level below any liquid delivery level of the heater tank. By filling the tank to a level below any liquid delivery level, the system may allow for expansion of liquid due to heating. For example, a liquid supply may open a valve for a period of time to deliver water under pressure to the tank while the tank is vented. After the period of time elapses, the valve may be closed so that the tank is filled to an expansion level below the delivery level. In other embodiments, a liquid level sensor in the tank may be used to detect the arrival of the liquid level in the tank at the expansion level so that a valve, pump or other component can be controlled to stop liquid flow into the tank. In other arrangements, a defined amount of liquid may be delivered to the tank by using a flow meter to measure flow into the tank or using a positive displacement pump (such as a diaphragm pump) that delivers a defined volume of liquid for each cycle and operating the pump for a specific number of cycles.

After filling the heater tank to the expansion level, liquid in the heater tank may be heated. Heating may be done by activating an electrical resistance heater element, actuating a burner element, etc., and monitoring a temperature of liquid in the tank using a temperature sensor such as a thermocouple, thermistor, etc. When the liquid reaches a desired temperature, such as a temperature suitable for forming a beverage, the heating element may be deactivated. Note that some embodiments may include two or more heating elements arranged at different levels or other locations in the tank, e.g., with one element arranged to heat liquid as it enters the tank and another element arranged to heat liquid near a top of the tank. These elements may be individually controlled, e.g., based on different temperature sensors associated with the tank.

Upon receipt of a beverage formation start command, the heater tank may be filled to the liquid delivery level. The beverage formation start command may indicate that the machine is being readied to form a beverage, and may include a signal that indicates that the liquid in the tank has reached a desired temperature, that a user has pressed a brew start button, that a cartridge holder or chamber has been closed, that a carafe has been placed to receive a beverage, etc. Filling to the liquid delivery level may be performed by delivering liquid to the tank until a liquid level in the tank is detected by a liquid level sensor to be at the delivery level, such as by a conductive probe, pressure sensor, optical detector, etc. detecting the presence of liquid at the delivery level. In some embodiments, a volume of liquid provided to fill the tank to the delivery level may be 5%, 7%, or 10% or less of a volume of liquid to be delivered to form a beverage and/or 5%, 7%, or 10% or less of a total volume of the tank. The tank may have two or more delivery levels, and a delivery level to which the tank is filled may be selected based on a desired volume of liquid to be provided to form a beverage.

After filling the heater tank to the liquid delivery level, liquid may be delivered from the heater tank to form a beverage. For example, the tank may be pressurized by an air pump to force liquid in the tank to flow out of a conduit leading to a beverage forming station. In other embodiments, liquid may be pumped from the tank, allowed to flow by gravity (and controlled by a valve), or otherwise be delivered to form a beverage. The liquid may be delivered immediately after the heater tank is filled to the liquid delivery level, or there may be some delay between filling the tank to the delivery level and delivering liquid from the tank to form a beverage.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a carafe 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus comprising:
   a housing to support components of the beverage forming apparatus;
   a beverage forming station supported by the housing and arranged to combine a precursor liquid with a beverage material to form a beverage that is dispensed via a dispense outlet;
   a precursor liquid supply system supported by the housing and including a heater tank having a heater to heat liquid in the tank, the precursor liquid supply system adapted to provide a controlled volume of precursor liquid to the beverage forming station, the controlled volume being equal to a volume in the tank between a liquid delivery level and a post-delivery level; and
   a control circuit adapted to control the liquid supply system to:
      deliver a first volume of precursor liquid to the heater tank in response to completing formation of a first beverage and prior to receiving a second beverage formation start command for preparing a second beverage, the first volume arranged to fill the heater tank from the post-delivery level to an expansion level below the liquid delivery level and above the post-delivery level and to heat the precursor liquid after the first volume of precursor liquid is delivered to the heater tank, the first volume being different from a total volume of the second beverage being formed, and
      deliver a second volume of precursor liquid in response to receiving the second beverage formation start command, the second volume arranged to fill the heater tank to the liquid delivery level, the second volume being equal to 5% or less of the controlled volume of liquid delivered to the beverage forming station and different from the total volume of the second beverage being formed;
   wherein the controlled volume used to form the second beverage is equal to the first and second volumes of precursor liquid delivered to the heater tank.

2. The apparatus of claim 1, wherein the beverage formation start command is received in response to a user actuating a beverage start switch.

3. The apparatus of claim 1, wherein the heater tank includes a single liquid delivery level.

4. The apparatus of claim 3, wherein the heater tank further includes a liquid level sensor arranged to detect a liquid level at the single liquid delivery level.

5. The apparatus of claim 4, wherein the heater tank includes a liquid level sensor arranged to detect a liquid level at the expansion level.

6. The apparatus of claim 1, wherein, after the heater tank is filled to the liquid delivery level in response to the beverage formation start command, the control circuit is arranged to control the liquid supply system to immediately deliver the controlled volume of precursor liquid from the heater tank without heating the liquid in the heater tank.

7. The apparatus of claim 1, wherein the second volume of precursor liquid delivered to the heater tank to raise the liquid level in the tank to the liquid delivery level is less than 5% of a volume of the heater tank.

8. The apparatus of claim 1, wherein the liquid supply system includes an air pump arranged to pressurize the heater tank to deliver liquid from the heater tank to the beverage forming station.

9. The apparatus of claim 1, wherein the control circuit is arranged so that immediately after the heater tank is filled to the liquid delivery level, the control circuit controls the liquid supply system to deliver liquid from the heater tank to the beverage formation station.

10. The apparatus of claim 1, wherein the beverage formation start command includes an indication that liquid in the heater tank has reached a desired temperature.

11. The apparatus of claim 1, wherein, after the heater tank is filled to the expansion level, the liquid in the tank is heated prior to filling the tank to the liquid delivery level.

12. The apparatus of claim 1, wherein, after the heater tank is filled to the expansion level and the precursor liquid is heated, a level of the precursor liquid in the tank is above the expansion level and below the liquid delivery level.

13. The beverage forming apparatus of claim 1, wherein the first volume is independent of a volume of the first beverage being formed.

14. The beverage forming apparatus of claim 1, wherein no precursor liquid is delivered from the heater tank between completing a first beverage formation cycle and delivering the controlled volume.

15. A method for controlling a beverage forming apparatus, comprising:
   providing a beverage forming apparatus including a liquid supply system having a heater tank adapted to deliver a controlled volume of liquid to form a beverage, the controlled volume being equal to a volume in the tank between a liquid delivery level and a post-delivery level;
   after completing a first beverage formation cycle to form a first beverage and prior to receipt of a beverage formation start command for a second beverage formation cycle, filling the heater tank with a first volume of liquid to an expansion level below the liquid delivery level and above the post-delivery level, the first volume being different from a total volume of the second beverage being formed;

heating the liquid in the heater tank after filling the heater tank to the expansion level;

adding a second volume of liquid to fill the heater tank to the liquid delivery level in response to receipt of the beverage formation start command, the second volume being equal to 5% or less of the controlled volume of liquid delivered to the beverage forming station and different from the total volume of the second beverage being formed; and delivering the controlled volume equal to the first and second volumes of liquid from the heater tank to form a second beverage during the second beverage formation cycle after filling the heater tank to the liquid delivery level.

16. The method of claim 15, further comprising receiving the beverage formation start command in response to a user actuating a beverage start switch.

17. The method of claim 15, wherein the heater tank includes a plurality of liquid delivery levels to which the heater tank is filled to deliver a corresponding controlled volume of liquid to form a beverage.

18. The method of claim 17, wherein the step of adding a second volume to fill the heater tank to the liquid delivery level includes using a liquid level sensor to detect a liquid level in the heater tank at one of the liquid delivery levels.

19. The method of claim 15, wherein the step of filling the heater tank to the expansion level includes using a liquid level sensor to detect a liquid level at the expansion level.

20. The method of claim 15, wherein the step of delivering liquid from the heater tank to form a beverage includes immediately delivering liquid from the heater tank to form a beverage after the heater tank is filled to the liquid delivery level.

21. The method of claim 15, wherein the step of adding a second volume of liquid to the heater tank to fill the heater tank to the liquid delivery level includes delivering a volume of liquid to the heater tank that is less than 5% of a volume of the heater tank.

22. The method of claim 15, wherein the step of delivering liquid from the heater tank to form a beverage includes pressurizing the heater tank with air to deliver liquid from the heater tank to a beverage forming station.

23. The method of claim 15, wherein, after heating the liquid in the heater tank, a level of the liquid in the tank is above the expansion level and below the delivery level.

24. The method of claim 15, wherein the step of filling the heater tank with a first volume includes filling the tank with the first volume of liquid independent of a volume of the first beverage being formed.

25. The method of claim 15, further comprising not delivering precursor liquid from the heater tank between completing the first beverage formation cycle and delivering the controlled volume.

* * * * *